United States Patent [19]

Denzel et al.

[11] 4,075,290

[45] Feb. 21, 1978

[54] HEAT SEALABLE POLYBUTENE-1 BLENDS CONTAINING POLYPROPYLENE OR ETHYLENE COPOLYMER

[75] Inventors: Horst Denzel; Otto Hahmann, both of Marl, Germany

[73] Assignee: Chemische Werke Huels Aktiengesellschaft, Marl, Germany

[21] Appl. No.: 378,689

[22] Filed: July 12, 1973

[30] Foreign Application Priority Data

July 12, 1972 Germany .............................. 2234103

[51] Int. Cl.² ........................ C08L 23/16; C08L 23/12
[52] U.S. Cl. ................................................ 260/897 A
[58] Field of Search ..................................... 260/897 A

[56] References Cited

U.S. PATENT DOCUMENTS

| 3,372,049 | 3/1968 | Schaffhausen ........................... 117/7 |
| 3,440,208 | 4/1969 | Foglia et al. ............................ 260/41 |
| 3,634,552 | 1/1972 | Foglia et al. ...................... 260/897 A |
| 3,733,373 | 5/1973 | McConnell et al. ............. 260/897 A |

FOREIGN PATENT DOCUMENTS

| 775,184 | 1/1968 | Canada ................................ 260/897 |
| 835,330 | 5/1960 | United Kingdom ................ 260/897 |

*Primary Examiner*—Carman J. Seccuro
*Attorney, Agent, or Firm*—Millen & White

[57] ABSTRACT

Polymer blends comprising a major amount of polybutene-1 with a minor amount of low-pressure polypropylene or ethylene/propylene or butene-1 copolymers exhibit improved physical properties.

6 Claims, No Drawings

HEAT SEALABLE POLYBUTENE-1 BLENDS CONTAINING POLYPROPYLENE OR ETHYLENE COPOLYMER

BACKGROUND OF THE INVENTION

This invention relates to heat-sealable polybutene-1 polymer blends.

It is known that polybutene-1, especially in the isotactic structure, possesses a number of advantageous properties as compared to other polyolefins. In many applications, these advantages are overshadowed by the difficulty of establishing durable and firm weld bonds of shaped articles, such as pipes or film, of polybutene-1; in particular, the resistance to further rupture or tearing is insufficient for many purposes of application.

Therefore, numerous attempts have been made to improve the weld strength of such films. According to German Unexamined Published Application No. 2,012,913 and U.S. Pat. No. 3,634,551, the polybutene-1 is admixed with about 1-5% weight of a low density polyethylene. This polyethylene is produced in accordance with the high-pressure method and has a density of 0.910 to 0.925; high density polyethylenes are said to be unsatisfactory because they produce erratic results.

In spite of prior art failures, it would be desirable to employ high-density polyolefins obtained according to the low-pressure process as additives to polybutene-1, since such a mixture would be composed exclusively of low-pressure polyolefins, thereby affording a better compatibility of the individual blend components and accordingly a reduction in the potential adverse effects of the additive on the valuable physical properties of polybutene-1.

OBJECTS OF THE INVENTION

Accordingly, it is an object of this invention to provide improved heat sealable isotactic polybutene-1 polymer blends.

Another object of the present invention is to provide such polybutene-1 blends consisting essentially of low-pressure polyolefins.

A further object of the present invention is to provide polybutene-1 blends which have improved heat sealing properties without sacrificing desired physical properties of isotactic polybutene-1.

An additional object of the present invention is to provide improved heat-weldable polybutene-1 pipes and packaging films.

Upon further study of the specification and appended claims, further objects and advantages of this invention will become apparent to those skilled in the art.

SUMMARY OF THE INVENTION

Briefly, the above and other objects are attained in one object of the present invention by providing a composition of matter comprising an intimate admixture of: (a) 80-99 weight percent isotactic polybutene-1 having a density of 0,914–0,919 and a solution viscosity molecular weight of 500,000–1,750,000; and (b) correspondingly 20-1 weight percent of at least one member selection from the group consisting of: (i) low pressure ethylene copolymers with 0.5-4 weight percent of propylene or butene-1 having a density of 0.930–0.938 and a solution viscosity molecular weight of 75,000–140,000 and (ii) isotactic polypropylene having a density of 0,90–0,91 and a solution viscosity molecular weight of 200,000–350,000.

DETAILED DISCUSSION

Films of the polymer blends according to this invention possess surprisingly improved properties including excellent weldability and a superior resistance to further tearing or rupturing, e.g. measured according to DIN 53,363.

Due to the improved properties of the polymer blends, these mixtures are useful for the production of blown films, flat flims, monofilaments, tapes, especially films of varying strengths for bags and heavy-duty sacks, for the construction industry and for agricultural purposes, and for all sectors of the packaging industry; i.e. products which can be further processed by heat-sealing, especially also in a stretched form. However, the novel mixtures can be utilized also with special advantage for the production of pipes, the weldability of which is considerably improved. The term heat-sealing, in this connection, encompasses the customary methods known in the art, e.g. heat impulse welding, hot wire welding, etc.

The term isotactic polybutene-1 as used herein refers to a polybutene-1 containing at least 95%, preferably at least 97% and especially at least 98% by weight of isotactic portions, determined as the diethyl ether-insoluble component. Useful in the present invention are such isotactic polybutenes having a molecular weight of about 500,000–1,750,000, especially 650,000–1,500,000 and preferably 750,000–1,400,000 as determined by solution viscosity in "Decalin" (decahydronophthalene). Suitable polybutenes have a density of 0,914–0,919, preferably 0,916–0,919 and especially 0,917–0,919.

Suitable polybutenes can be obtained, for example, in accordance with Ziegler-Natta low-pressure polymerization of butene-1, e.g. by polymerizing butene-1 with catalysts of $TiCl_3$ or $TiCl_3 \cdot AlCl_3$ and $Al(C_2H_5)_2CL$ at temperatures of 10°–50° C., preferably 20°–40° C., e.g. according to the process of German Published Application No. 1,570,353, and further processing the polymer in accordance with conventional methods, e.g. according to the processes of German Published Applications Nos. 1,292,379 and 1,570,337.

Suitable polyethylene copolymers contains 0.5–4% by weight of propylene or butene-1, especially 1–3% by weight, preferably 2–2.5% by weight, polymerized therein. The particular manner in which the comonomer is present in the polymer is not critical, and either random or graft copolymers are suitable, although the random polymers are generally preferred. This polyethylene has a high density, e.g. of 0.930 to 0.938, preferably 0.931 to 0.937 and especially 0.932 to 0.936. Such copolymers are obtained, for example, by the Ziegler low-pressure procedure, polymerizing ethylene with optionally minor proportions of propylene or butene-1 in the presence of an inert solvent on mixed catalysts from heavy metal compounds, especially those of titanium, e.g. titanium tetrachloride, on the one hand, and organometallic compounds, especially those of aluminum, on the other hand, and working up to product in a conventional manner. One suitable polymerization technique is taught in West German Pat. No. 1,445,303. Particularly advantageous in this connection is a mixed catalyst from dichlorotitanic acid dialkyl esters, e.g. the isopropyl ester of dichlorotitanic acid, on the one hand, and ethylaluminum sesquichloride, on the other hand, in a molar ratio of Ti:Al of 1:1 to 1:1.6, preferably 1:1.2 to 1:1.4, and especially about 1:1.3, wherein the molecular weights of polymer products can be controlled in a conventional manner by varying this molar ratio and/or by the addition of hydrogen or other molecular weight regulators to the reaction mixture.

A suitable isotactic polypropylene is one obtained according to the Ziegler-Natta low-pressure method. In this process, propylene is polymerized, preferably in the presence of an inert solvent, on mixed catalysts, the heavy metal component of which is used in an oxidizable low valence, e.g. $TiCL_3$.

Suitable polypropylenes have a solution viscosity molecular weight, as measured in "Decalin," of between 200,000 and 350,000, preferably between 215,000 and 310,000, corresponding to RSV-values of 2–2.8 dl./g., and a density of 0,90–0,91, preferably 0,904–0,910 and especially 0,907–0,910.

Usable mixtures contain 80–99%, preferably 85–95%, especially 88–92% by weight of isotactic polybutene-1 and correspondingly 1–20%, preferably 5–15%, especially 8–12% by weight of polyethylene or polypropylene, based on the total polymer content.

These mixtures can contain the usual additives, e.g. anti-static agents, flame retardants, lubricants, stabilizers of all types, fillers, or pigments.

Such mixtures are obtained in a manner known per se in customary mixing devices from the powders, powder granules, or granules of the individual components.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Polymer blends according to the present invention were prepared using conventional blending techniques from the following materials:

The isotactic polybutenes-1 (PB-1) of RSV 2.0 and 3.0 corresponding to molecular weights of 766,000 and 1,300,000 respectively and densities of 0,919 (belonging to RSV 2,0) and 0,916 (belonging to RSV 3,0) respectively are obtained from butene-1 in a bulk polymerization process using a $TiCl_3$ and $Al(C_2H_5)_2Cl$ catalysts (Al:Ti ratio 1:1,4 and with 1,3millimoles combined catalyst per liter hydrocarbons) at 30° C.

The polyethylene (PE) contains 2.5% by weight butene-1 has a molecular weight of 91,000 and a density of 0.935.

The isotactic polypropylenes (PP) have an RSV-value of 2, 2,08, and 2.8, corresponding to molecular weights of 215,000, 226,000 and 310,000, respectively.

The RSV values are measured following DIN 53 727 at 135° C, using a solution of 0,1 g/dl polyolefine in decahydronaphthalene.

TABLE

| MIXTURES | | | 90 g. PB-1 (MW 766 000) + 10 g. PE (MW 91 000) (PB-1) | | 90 g. PB-1 (MW 1 300 000) + 10 g. PE (MW 91 000) (PB-1) | | 95 g. PB-1 (MW 766 000) + 5 g. PE (MW 91 000) |
|---|---|---|---|---|---|---|---|
| Tear strength | longitud. | kp/cm² | 520 | (445) | 500 | (580) | 480 |
|  | transverse | " | 250 | (235) | 395 | (270) | 310 |
| Tensile elongation | longitud. | % | 190 | (140) | 220 | (80) | 165 |
|  | transverse | % | 280 | (270) | 350 | (135) | 335 |
| Resistance to further tearing (DIN 53,363) | longitud. | kp/mm | 8.1 | (3.4) | 8.2 | (2.4) | 6.3 |
|  | transverse | " | 17.5 | (4.4) | 18.2 | (1.2) | 16.1 |
| Weld seam strength factor (DIN 53,455) | | $\frac{\delta 1}{\delta 0}$ | 0.6 | (0.3) | 0.35 | (0.26) | 0.5 |
| Impact tensile strength test (DIN 53,448) | longitud. | kp cm/cm² | 1010 | (640) | 1880 | (1125) | 1210 |
|  | transverse | " | 505 | (305) | 765 | (306) | 340 |
| Notch impact tensile strength test | longitud. | kp cm/cm² | 165 | (130) | 420 | (126) | 160 |
|  | transv. | " | 160 | (125) | 180 | (112) | 145 |

| MIXTURES | | | 85 g. PB-1 (MW 766 000) + 15 g. PE (MW 91 000) | 90 g. PB-1 (MW 766 000) + 10 g. PP (MW 215 000) | 90 g. PB-1 (MW 766 000) + 10 g. PP (MW 226 000) |
|---|---|---|---|---|---|
| Tear strength | longitud. | kp/cm² | 410 | 360 | 420 |
|  | transverse | " | 310 | 310 | 350 |
| Tensile elongation | longitud. | % | 170 | 270 | 280 |
|  | transverse | % | 285 | 360 | 380 |
| Resistance to further tearing (DIN 53,363) | longitud. | kp/mm | 9.8 | 9.6 | 3.8 |
|  | transverse | " | 24.2 | 27.2 | 27.8 |
| Weld seam strength factor (DIN 53,455) | | $\frac{\delta 1}{\delta 0}$ | 0.35 | 0.71 | 0.67 |
| Impact tensile strength test (DIN 53,448) | longitud. | kp cm/cm² | 1100 | 815 | 1030 |
|  | transverse | " | 300 | 210 | 220 |
| Notch impact tensile strength test | longitud. | kp cm/cm² | 150 | 130 | 150 |
|  | transv. | " | 150 | 140 | 130 |

| MIXTURES | | | 90 g. PB-1 (MW 766 000) + 10 g. PP (MW 310 000) | 95 g. PB-1 (MW 766 000) + 5 g. PP (MW 215 000) | 95 g. PB-1 (MW 766 000) + 5 g. PP (MW 310 000) |
|---|---|---|---|---|---|
| Tear strength | longitud. | kp/cm² | 340 | 430 | 470 |
|  | transverse | " | 260 | 235 | 245 |
| Tensile elongation | longitud. | % | 310 | 165 | 175 |
|  | transverse | % | 320 | 100 | 90 |
| Resistance to further tearing (DIN 53,363) | longitud. | kp/mm | 13.9 | 5.8 | 4.4 |
|  | transverse | " | 17.1 | 18.2 | 18.2 |
| Weld seam strength factor (DIN 53,455) | | $\frac{\delta 1}{\delta 0}$ | 0.65 | 0.48 | 0.48 |
| Impact tensile strength test (DIN 53,448) | longitud. | kp cm/cm² | 275 | 1250 | 1200 |
|  | transverse | " | 230 | 300 | 210 |

TABLE-continued

| | | | | | |
|---|---|---|---|---|---|
| Notch impact tensile strength test | longitud. transv. | kp cm/cm² " | 165 130 | 130 100 | 165 95 |

The table shows that, as compared to pure PB-1 (values in parentheses), the mixtures of the present invention show quite surprising, quantum-like improvements in particular in the weld seam strength and the resistance to further tearing, and the considerable improvement in the general array of characteristics can clearly be seen.

With the use of PE containing 2.0% of propylene in place of the PE containing 2.5% of butene-1, comparable results are attained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition of matter consisting essentially of an intimate admixture of:
   (a) 85–95 weight percent of an at least 95% isotactic polybutene-1 having a density of 0.914–0.919 and a solution viscosity molecular weight of 650,000–1,500,000; and
   (b) correspondingly 15–5 weight percent of a low pressure ethylene copolymer with 1–3 weight percent of propylene or butene-1 having a density of 0.931–0.937 and a solution viscosity molecular weight of 75,000–140,000.

2. A composition according to claim 1, wherein component (b) is a copolymer with 2–2.5 weight percent of propylene or butene-1 having a density of 0.932–0.936.

3. A composition according to claim 2, wherein said isotactic polybutene-1 has a density of 0.916–0.919 and a solution viscosity molecular weight of 750,000–1,400,000.

4. A composition of matter consisting essentially of an intimate admixture of:
   (a) 85–95 weight percent of an at least 95% isotactic polybutene-1 having a density of 0.914–0.919 and a solution viscosity molecular weight of 650,000–1,500,000; and
   (b) correspondingly 15–5 weight percent of an isotactic polypropylene having a density of 0.904–0.910 and a solution viscosity molecular weight of 200,000–350,000.

5. A composition according to claim 4, wherein said isotactic polypropylene has a density of 0.907–0.910 and a solution viscosity molecular weight of 215,000–310,000.

6. A composition according to claim 5, wherein said isotactic polybutene-1 has a density of 0.916–0.919 and a solution viscosity molecular weight of 750,000–1,400,000.

* * * * *